(12) United States Patent
Hegfield et al.

(10) Patent No.: US 11,061,858 B2
(45) Date of Patent: *Jul. 13, 2021

(54) MERGING DIRECTORY INFORMATION FROM A USER DIRECTORY TO A COMMON DIRECTORY

(71) Applicant: International Business Machines Corporation, Armonk, NY (US)

(72) Inventors: Gordon E. Hegfield, Amherst, NH (US); Russell Holden, Boxborough, MA (US); Stanley K. Jerrard-Dunne, Leopardstown (IE); Ravi Ranjan, Littleton, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 162 days.

This patent is subject to a terminal disclaimer.

(21) Appl. No.: 16/195,664

(22) Filed: Nov. 19, 2018

(65) Prior Publication Data

US 2019/0087434 A1 Mar. 21, 2019

Related U.S. Application Data

(63) Continuation of application No. 14/830,400, filed on Aug. 19, 2015, now Pat. No. 10,169,351.

(51) Int. Cl.
*G06F 21/62* (2013.01)
*G06F 16/13* (2019.01)
(Continued)

(52) U.S. Cl.
CPC ............ *G06F 16/13* (2019.01); *G06F 16/214* (2019.01); *G06F 16/24564* (2019.01);
(Continued)

(58) Field of Classification Search
CPC ............. G06F 17/30091; G06F 17/303; G06F 17/30507; G06F 17/30917; G06F 17/30952
(Continued)

(56) References Cited

U.S. PATENT DOCUMENTS 6,453,353 B1 * 9/2002 Win .................. G06F 21/604
709/225
7,461,096 B1 12/2008 Hurren et al.
(Continued)

OTHER PUBLICATIONS

List of IBM Patents or Patent Applications Treated as Related; Nov. 19, 2018; pp. 1-2.

*Primary Examiner* — Hanh B Thai
(74) *Attorney, Agent, or Firm* — Fabian VanCott; Steven L. Nichols

(57) ABSTRACT

Merging directory information from a user directory to a common directory includes based on a rule associated with contents of a user directory of a local database, extracting a department indicator from the user directory, mapping the department indicator to a corresponding user record in a common directory of a registry database, and based on the department indicator, marking the user record in the common directory with a department that corresponds to the contents from the user directory with a department for controlling access to that user record in the registry database.

20 Claims, 7 Drawing Sheets

(51) Int. Cl.
  *G06F 16/84* (2019.01)
  *G06F 16/21* (2019.01)
  *G06F 16/901* (2019.01)
  *G06F 16/2455* (2019.01)
(52) U.S. Cl.
  CPC .......... *G06F 16/86* (2019.01); *G06F 16/9017* (2019.01); *G06F 21/6227* (2013.01)
(58) Field of Classification Search
  USPC ........................................................ 707/781
  See application file for complete search history.

(56) References Cited

U.S. PATENT DOCUMENTS

| | | | |
|---|---|---|---|
| 7,689,120 B2 | 3/2010 | Hoang | |
| 8,280,908 B2 | 10/2012 | Khalidi et al. | |
| 8,327,096 B2* | 12/2012 | Silvera | G06F 8/63 |
| | | | 711/162 |
| 9,037,532 B1* | 5/2015 | Pradhan | G06F 16/27 |
| | | | 707/610 |
| 9,081,756 B2 | 7/2015 | Maxwell et al. | |
| 9,213,836 B2* | 12/2015 | Mayer | G06F 21/55 |
| 9,432,371 B2* | 8/2016 | Sinn | G06Q 10/10 |
| 9,760,589 B2 | 9/2017 | Rangarajan | |
| 2001/0013096 A1* | 8/2001 | Luckenbaugh | G06F 21/6227 |
| | | | 713/154 |
| 2002/0143909 A1 | 10/2002 | Botz | |
| 2003/0140119 A1* | 7/2003 | Acharya | H04L 67/16 |
| | | | 709/219 |
| 2003/0140308 A1 | 7/2003 | Murthy | |
| 2004/0204836 A1 | 10/2004 | Riney | |
| 2009/0077043 A1 | 3/2009 | Chang | |
| 2009/0216723 A1 | 8/2009 | Harvey et al. | |
| 2010/0169881 A1* | 7/2010 | Silvera | G06F 8/63 |
| | | | 718/1 |
| 2010/0229169 A1 | 9/2010 | Bunnell | |
| 2010/0262638 A1 | 10/2010 | Fitzgerald | |
| 2014/0075501 A1 | 3/2014 | Srinivasan et al. | |
| 2015/0254305 A1 | 9/2015 | Okamura | |
| 2016/0342633 A1 | 11/2016 | Senthilnathan | |
| 2016/0342661 A1 | 11/2016 | Kumarasamy | |
| 2019/0354809 A1* | 11/2019 | Ralhan | G06K 9/6264 |

* cited by examiner

MERGING DIRECTORY INFORMATION FROM A USER DIRECTORY TO A COMMON DIRECTORY

BACKGROUND

The present invention relates to merging directory information, and more specifically, to merging directory information from a user directory to a common directory.

A directory is a mechanism used to organize information, for example, contact information associated with a person or an organization, for the purpose of allowing users to contact a desired person or organization. The contact information in the directory may include user names, electronic mail (email) addresses, phone numbers, business names, department names, contact data, other directory information, or combinations thereof. Further, the directory information in the directory is organized logically, for example, alphabetically. This allows the users to access the directory information in the directory efficiently such that the desired person or organization may be easily found in the director and contacted by the user.

BRIEF SUMMARY

A method for merging directory information from a user directory to a common directory includes based on a rule associated with contents of a user directory of an local database, extracting a department indicator from the user directory, mapping the department indicator to a corresponding user record in a common directory of a registry database, and based on the department indicator, marking the user record in the common directory that corresponds to the contents from the user directory with a department for controlling access to that user record in the registry database.

A system for merging directory information from a user directory to a common directory includes a processor and computer program code, communicatively coupled to the processor, the computer program code includes an extracting engine to, based on a rule associated with contents of a user directory of an local database, extract a department indicator from the user directory, a mapping engine to map the department indicator to a corresponding user record in a common directory of a registry database, a marking engine to, based on the department indicator, mark the user record in the common directory that corresponds to the contents from the user directory with a department for controlling access to that user record in the registry database, an assigning engine to, based on the department, assign access controls to an administrator for the user record for controlling the access to that user record in the registry database, and a permitting engine to, based on the access controls, permit the administrator to access the user record in the registry database.

A machine-readable storage medium encoded with instructions for merging directory information from a user directory to a common directory, the instructions executable by a processor of a system to cause the system to, based on a rule associated with contents of a user directory of an local database, extract a department indicator from the user directory, map the department indicator to a corresponding user record in a common directory of a registry database, based on the department indicator, mark the user record in the common directory that corresponds to the contents from the user directory with a department for controlling access to that user record in the registry database, and based on the department, assign access controls to an administrator for the user record for controlling the access to that user record in the registry database.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
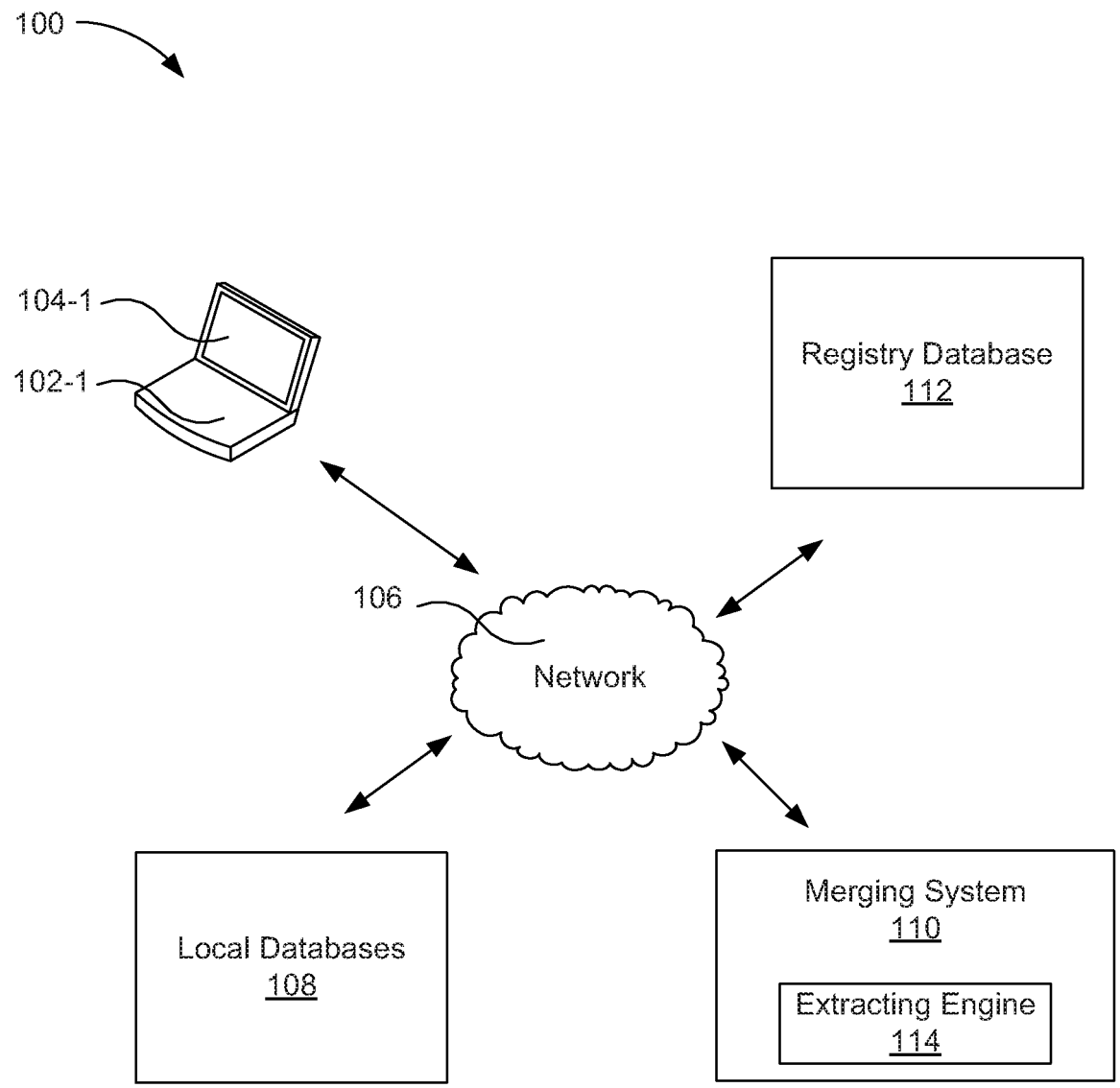
FIG. 1 is a diagram of an example of a system for merging directory information from a user directory to a common directory, according to one example of principles described herein.

The present specification describes a method and system for merging directory information from a user directory to a common directory, such that specific users, such as administrators, may access specific user records in the common directory. The user directory may be part of a local database, while the common directory is in a remote, more widely visible database.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions record thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, a directory may be used to organize information associated with a number of individual people or organizations for the purpose of allowing users to contact a target person or organization. Often, an organization includes a number of departments. Accordingly, the organization may store directory information for the users in a department in a specific database. As a result, each of the user directories is associated with a department of the organization and stored in a different database to maintain departmental segregation of the directory information. Typically, the users associated with a user directory may access the directory information from that user directory. By accessing the directory information, the users may retrieve or modify the directory information. The directory information may be modified by adding, deleting or updating the information.

Often, the directory information in the user directories is merged with a common directory such that users may access a single directory. The merging of the directory information in the department-specific user directories with the common directory results in the loss of departmental segregation. As a result, directory information in the common directory may be accessible to all of the users such that departmental segregation is not maintained.

The principles described herein include a method for merging directory information from a user directory to a common directory while maintaining a degree of departmental control over the information in the common directory originating with a specific department. Such a method includes, based on a rule associated with contents of a user directory of a local database, extracting a department indicator from the user directory, mapping the department indicator to a corresponding user record in a common directory of a registry database, and, based on the department indicator, marking the user record in the common directory that corresponds to the contents from the user directory with a department for controlling access to that user record in the registry database. Such a method allows departments to be delineated such that departmental segregation or control is maintained in the common database. As a result, read and/or write access to user records may be limited to specific administrators based on the departments marked on the user records in the common database.

In the present specification and in the appended claims, the term "rule" means a mechanism used to extract a department indicator from a user directory of a local database. A rule may be a primary rule, a secondary rule, or be a default value. Further, a rule may include a list of rules that are iterated through until a department is determined via the extracting of the department indicator from the user directory of the local database. The list of rules may be an ordered set of rules. Further, the default value may be used when the primary rule or the secondary rule fails to determine a department via the extracting of the department indicator from the user directory of the local database.

In the present specification and in the appended claims, the term "user directory" means a mechanism to organize directory information for the purpose of contacting a person or an organization. The user directory may be stored in a local database. Further, the user directory is used to identify an individual or an organization. As a result, the user directory may include the individual's identity.

In the present specification and in the appended claims, the term "department indicator" means a mechanism used to identify a department. The department indicator may indicate that a user or organization associated with the user directory belongs to a department. As a result, the department indicator indicates which department a user or an organization belongs to.

In the present specification and in the appended claims, the term "contents" means directory information that is used to identify a person or an organization within a user directory. The contents may be a user identification (ID), a department ID, an electronic mail (email) address, a phone number, a home address, other contents, or combinations thereof.

In the present specification and in the appended claims, the term "common directory" means a mechanism to organize directory information for the purpose of contacting a person or an organization via a single directory. The common directory may be located in a registry database.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for merging directory information from a user directory to a common directory, according to one example of principles described herein. As will be described below, a merging system is in communication with a network to, based on a rule associated with contents of a user directory of a local database, extract a department indicator from the user directory. Further, the merging system maps the department indicator to a corresponding user record in a common directory of a registry database. The merging system marks based on the department indicator, the user record in the common directory that corresponds to the contents from the user directory with a department for controlling access to that user record in the registry database.

As illustrated, the system (100) includes a user device (102) with a display (104). In this example, users, such as administrators, may access local databases (108) via the user device (102). The administrators may update directory information associated with user directories of the local databases (108). The administrators may update the directory information associated with the user directories of the local databases (108) by adding, deleting, or updating the directory information in the user directories.

As illustrated, the system (100) includes the local databases (108). As mentioned above, the local databases (108) may include a number of user directories. As will be described below, the user directories may include registered source fields, contents, and department indicators.

Further, the system (100) includes a registry database (112). The registry database (112) may include a common directory that is used to merge the number of user directories of the local databases (108) into a single directory. As will be described in other parts of this specification, the common directory may include a number of user records marked with departments to maintain departmental segregation in the common directory.

The system (100) further includes a merging system (110). The merging system (110) may be in communication with the user device (102), the local databases (108), and the registry database (112) over a network (106).

The merging system (110) extracts, based on a rule associated with contents of a user directory of the local databases (108), a department indicator from the user directory. The rule may be a primary rule, a secondary rule, a list or rules, or a default value. Further, the extracting is executed via an extracting engine (114). The merging system (110) maps the department indicator to a corresponding user record in the common directory of the registry database (112). Further, the merging system (110) marks, based on the department indicator, the user record in the common directory that corresponds to the contents from the user directory with a department for controlling access to that user record in the registry database (112). As a result, departments are delineated such that departmental segregation is maintained in the common database. Further, access to specific departments may be controlled when an organization authenticates to the registry database (112), thus controlling a multi-tenant aspect. More information about the merging system (110) will be described later on in this specification.

While this example has been described with reference to the merging system being located over the network, the merging system may be located in any appropriate location according to the principles described herein. For example, the merging system may be located in the user device, the local databases, the registry database, a server, a datacenter, other locations, or combinations thereof.

While this example has been described with reference to the user devices being located over the network, the user devices may be in direct communication with other parts of the system. For example, the user devices may be in direct communication with the local databases.

Figure 2:
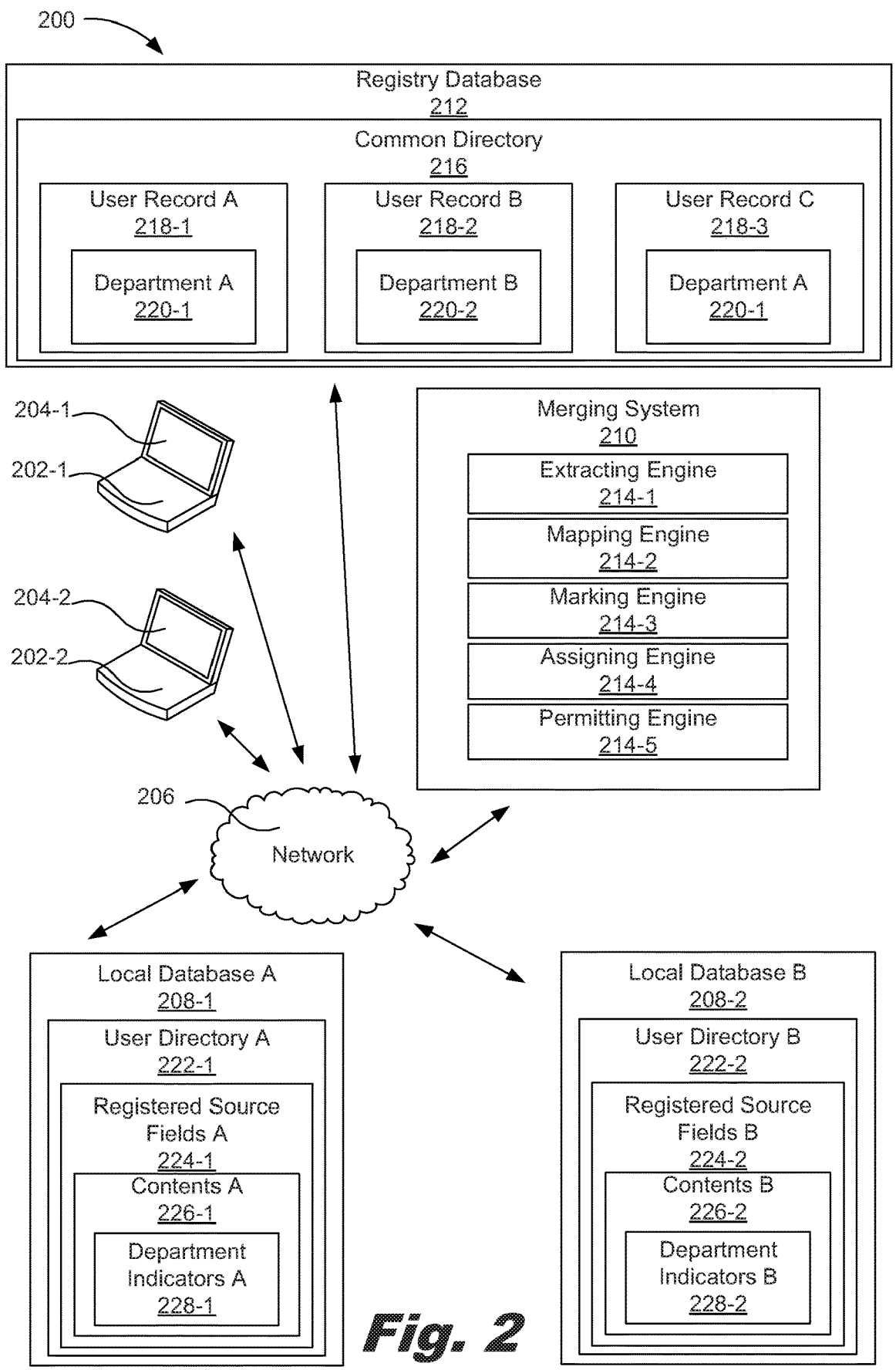
FIG. 2 is a diagram of an example of a system for merging directory information from a user directory to a common directory, according to one example of principles described herein.

FIG. 2 is a diagram of an example of a system for merging directory information from a user directory to a common directory, according to one example of principles described herein. As will be described below, a merging system is in communication with a network to, based on a rule associated with contents of a user directory of a local database, extract a department indicator from the user directory. Further, the merging system maps the department indicator to a corresponding user record in a common directory of a registry database. The merging system marks, based on the department indicator, the user record in the common directory that corresponds to the contents from the user directory with a department for controlling access to that user record in the registry database.

As illustrated, the system (200) includes a number of user devices (202) with displays (204). The system (200) includes user device A (202-1) and user device B (202-2). In an example, a user, such as an administrator, uses one of the user devices (202) to access local databases (206). The administrator may update directory information associated with user directories (222) of the local databases (208). The administrator may update the directory information associated with the user directories (222) of the local databases (208) by adding, deleting, directory information associated with the user directories (222). Further, each of the user devices (202) may be associated with an administrator. For example, user device A (202-1) may be associated with administrator A and user device B (202-2) may be associated with administrator B.

Further, the system (200) includes the local databases (208). The system (200) may include local database A (208-1) and local database B (208-2). The local databases (208) may store directory information associated with user directories (222) associated for organizations. For example, local database A (208-1) may store directory information in user directory A (222-1) for organization A. Further, local database B (208-2) may store directory information in user directory B (222-2) for organization B. Further, each of the organizations may include a number of departments. For example, organization A may include department A and department C. Organization B may include department B and department D.

Further, each of the local databases (208) may include the user directories (222). As illustrated, local database A (208-1) may include user directory A (222-1) and local database B (208-2) may include user directory B (222-2). Each of the user directories (222) may be a mechanism to organize directory information for the purpose of contacting a person, an organization or locating the person for administrative purposes.

Further, each of the user directories (222) may include registered source fields (224). For example, user directory A (222-1) may include registered source fields A (224-1) and user directory B (222-2) may include registered source fields B (224-2). The registered source fields (224) include information such as names, addresses, or other types of information.

Each of the registered source fields (224) may include contents (226). For example, registered source fields A (224-1) may include contents A (226-1) and registered source fields B (224-2) may include contents B (226-2). The contents (226) may be information that is used to identify a person or an organization within a user directory. The contents may be a user ID, a department ID, an email address, a phone number, a home address, other contents, or combinations thereof.

Further, the contents (226) may include department indicators (228). Contents A (226-1) may include department indicator A (228-1) and contents B (226-2) may include department indicator B (228-2). The department indicators (226) may be a mechanism used to identify a department. The department indicator may indicate that a user or organization associated with the user directory belongs to a department.

The system (200) further includes a registry database (212). The registry database (212) includes a common directory (216) that is used to merge the number of user directories (222) into a single directory.

Further, the common directory (216) may include a number of user records (218). For example, the common directory (216) may include user record A (218-1), user record B (218-2), and user record C (218-3). The user records (218) may be derived from the contents (226) of the user directories (222). For example, user record A (218-1) and user record B (218-2) may be derived from contents A (226-1). Further, user record C (218-3) may be derived from contents B (226-2).

As will be described below, each of the user records (218) may be marked, via a merging system (210), with a department (220). For example, user record A (218-1) may be marked with department A (220-1). Department A (220-1) may indicate user record A (218-1) is associated with department A of organization A. User record B (218-2) may be marked with department B (220-2). Department B (220-2) may indicate that user record B (220-2) is associated with department B of organization B. Further, user record C (218-3) may be marked with department A (220-1).

The system (200) further includes the merging system (210). In one example, the merging system (210) includes a processor and computer program code. The computer program code is communicatively coupled to the processor. The computer program code includes a number of engines (214). The engines (214) refer to program instructions for performing a designated function. The computer program code causes the processor to execute the designated function of the engines (214). In other examples, the engines (214) refer to a combination of hardware and program instructions to perform a designated function. Each of the engines (214) may include a processor and memory. The program instructions are stored in the memory and cause the processor to execute the designated function of the engine. As illustrated, the merging system (204) includes an extracting engine (214-1), a mapping engine (214-2), a marking engine (214-3), an assigning engine (214-4), and a permitting engine (214-5).

The extracting engine (214-1) extracts, based on a rule associated with contents (226) of the user directories (222) of local databases (208), a department indicator (228) from the user directories (222). For example, the extracting engine (214-1) may extract based on a primary rule associated with contents A (226-1) of user directory A (222-1) of local database A (208-1), department indicators A (228-1) from the user directory A (222-1). If a primary rule cannot determine a department indicator, a secondary rule or subsequent rules are used until a department indicator is determined. If no rule determines a department indicator, then a default value is used. For example, if a primary rule and a secondary rule fail to determine a department indicator, the extracting engine (214-1) extracts, based on a default value associated with contents B (226-2) of user directory B (222-2) of local database B (208-2), department indicators B (228-2) from user directory B (222-2).

The rules may include a regular expression pattern. The regular expression pattern extracts the department indicator from the user directories (222). As will be described in other parts of this specification, the regular expression pattern may be part of the contents (226) of the registered source fields (224).

Further, a secondary rule is established when the primary rule fails to determine a department via a department indicator. Although not illustrated, the secondary rule may utilize an alternate user directory to determine the department indicator. In some examples, the alternate user directory may be local database B (208-2) if the merging system (210) initially accesses local database A (208-1). In other examples, the alternate user directory may be part of another system that the merging system (210) can access.

As mentioned above, a default value is used when the rule and the secondary rule fails to determine a department. In some examples, the default value may be associated with an expression such as none. More information about the rules will be described in other parts of this specification.

The mapping engine (214-2) maps the department indicator to a corresponding user record (218) in the common directory (216) of the registry database (212). The mapping engine (214-2) maps the department indicator (228) to a corresponding user record (218) in a common directory (216) of a registry database (212) based on a source field name associated with the contents (224) of the user directory (222) of the local database (208), by determining the user directory (226). For example, the mapping engine (214-2) maps the department indicators A (228-1) to the corresponding user record in the common directory (216) of the registry database (212) by determining, based on a source field name associated with the contents A (224-1), user directory A (226-1) of the local database A (208-1). Further, the mapping engine (214-2) maps the department indicators (228) to the corresponding user records (218) in the common directory (216) of a registry database (212) by sending a key field value associated with the contents (226) to a rule engine determine a department. The key field value is matched to an appropriate user recorded (218) in the common directory (216).

The mapping engine (214-2) further maps the department indicators (228) to the corresponding user record (218) in the common directory (216) of a registry database (212) by matching, via the rule, a regular expression pattern with a value associated with the source field name to determine the department indicator. For example, the mapping engine (214-2) maps the department indicators (228) to the user record A (218-1) in the common directory (216) of a registry database (212) by matching, via the rule, a regular expression pattern with a value associated with the source field name to determine the department indicator A (228-1).

The mapping engine (214-2) maps the department indicators (228) to the corresponding user record in the common directory (216) of a registry database (212) by establishing based on the department indicator (228), a department (220) for the marking of the user record (218) in the common directory (216) that corresponds to the contents (226) from the user directory (222). For example, the mapping engine (214-2) maps the department indicators A (228-1) to the user record A (218-1) in the common directory (216) of the registry database (212) by establishing, based on the department indicators A (228-1), department A (220-1).

The marking engine (214-3) marks, based on the department indicators (228), the user record (218) in the common directory (216) that corresponds to the contents (226) from the user directory (222) with department (220) for controlling access to that user records (218) in the registry database (212). For example, if user record A (218-1) and user record C (218-3) are associated with department A, user record A (218-1) and user record C (218-3) are marked with department A (220-1).

The assigning engine (214-4) assigns, based on the department, access controls to an administrator for the user record (218) for controlling the access to that user record (218) in the registry database. For example, the assigning engine (214-4) assigns, based on the department A (220-1), access controls to administrator A for user record A (218-1) and user record C (218-3) for controlling the access to user record A (218-1) and user record C (218-3) in the registry database (212). Further, the assigning engine (214-4) assigns, based on the department B (220-2), access controls to administrator B for user record B (218-2) for controlling the access to user record B (218-2) in the registry database (212). As will be described below, administrator A is permitted to access user record A (218-1) and user record C (218-3) in the registry database (212). Further, administrator B is permitted to access user record B (218-2) in the registry database (212).

The permitting engine (214-5) permits, based on the access controls, the administrator to access the user record (218) in the registry database (212). For example, administrator A may access user record A (218-1) and user record C (218-3). Administrator B may access user record B (218-2).

An overall example of FIG. 2 will now be described. The extracting engine (214-1) extracts, based on a rule associated with contents A (226-1) of user directory A (222-1) of local database A (208-1), department indicators A (228-1) from user directory A (222-1). The mapping engine (214-2) maps department indicators A (228-1) to the user record A (218-1) in the common directory (216) of the registry database (212). The marking engine (214-3) marks user record A (218-1) in the common directory (216) that corresponds to contents A (226-1) from user directory (226) with department A (220-1) for controlling access to user record A (218-1) in the registry database (212). The assigning engine (214-4) assigns, based on department A (220-1), access controls to administrator A for user record A (218-1) for controlling the access to user record A (218-1) in the registry database (212). The permitting engine (214-5) permits, based on the access controls, administrator A to access user record A (218-1) in the registry database (212).

Figure 3:
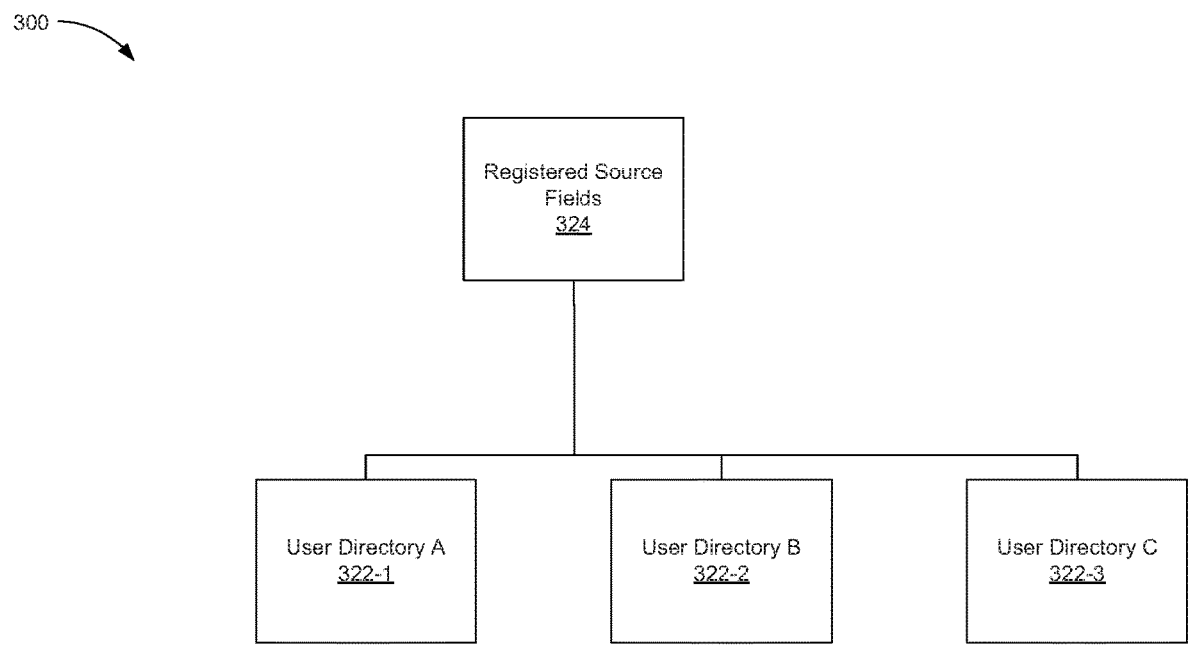
FIG. 3 is a diagram of an example of a number of user directories, according to one example of principles described herein.

FIG. 3 is a diagram of an example of a number of user directories, according to one example of principles described herein. As will be described below, the system includes a number of user directories and registered sources fields.

As illustrated, the system (300) includes a number of user directories (304). For example, the system (300) includes user directory A (322-1), user directory B (322-2), and user directory C (322-3). Further, each of the user directories (322) may be registered with the merging system or registry database of FIG. 2. Further, the user directories (322) provides a list of meta-data names such as registered source fields (324) for which it can provide directory information. The registered source fields (324) may include specific names. For example, the specific names of the registered source fields (324) may include, but are not limited to, company-ndCertificateExpiration, company-ndInternetAddress, company-ndFirstName, company-ndMailFile, company-ndShortName, and mail, other registered source fields, or combinations thereof. In other examples, the registered source fields (324) may include general names such as name, address, company, email, other general names, or combinations thereof.

The user directories (322) register this list of registered source fields (324) by calling a network application program interface (API), providing a uniform resource location (URL) to an API on which it can be called back, and indicating which of the registered source fields is the key field value that matched the user identity in the registry database of FIG. 2. An example, of such a call may be cloud.register("https://UserDirectoryB", {fieldlist}, "company-ndInternetAddress"). Further, the registry database of FIG. 2 may store this information.

Figure 4:
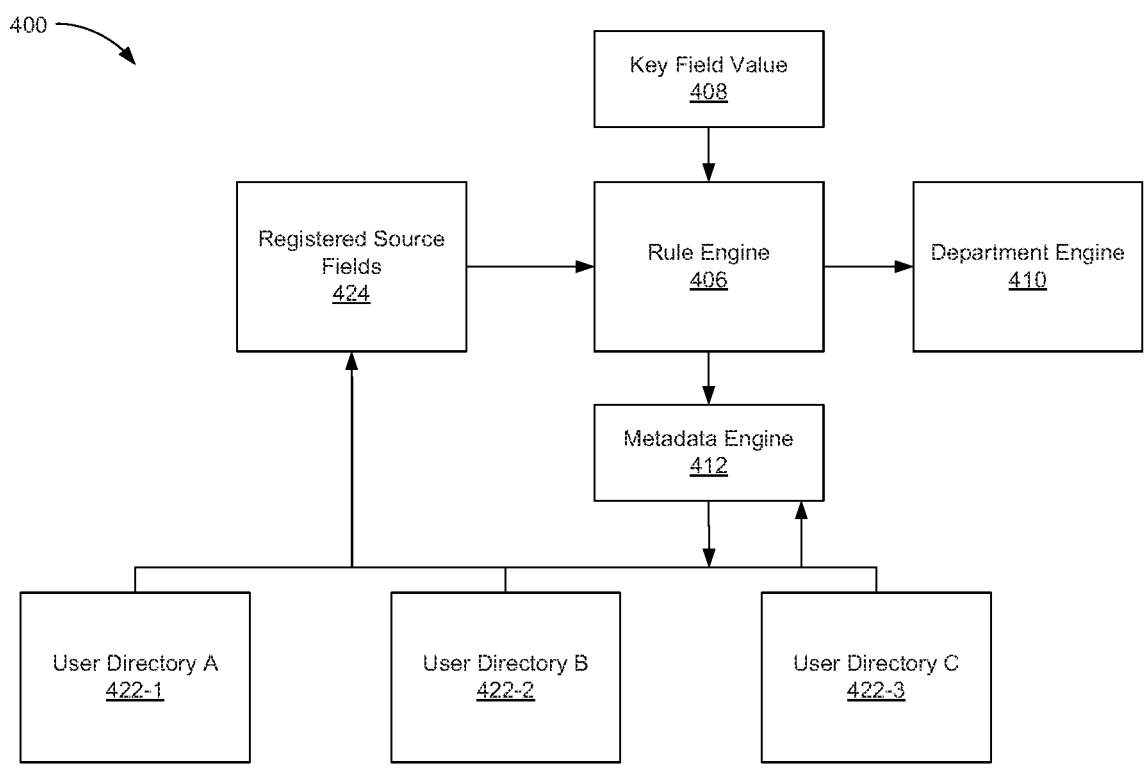
FIG. 4 is a diagram of an example of a system for determining a department, according to one example of principles described herein.

FIG. 4 is a diagram of an example of a system for determining a department, according to one example of principles described herein. As will be described below, the system includes a number of user directories, registered sources fields, and a rule engine.

As illustrated, the system (400) includes user directory A (422-1), user directory B (422-2), and user directory C (422-3). The user directories (422) may be in communication with the registered source fields (424) and a metadata engine (412).

Further, the registered source fields (424) may be in communication with a rule engine (406). For an organization a rule, such as primary rule, a secondary rule, or a default value is set and available to the rule engine (406). The rule engine (406) may be in communication with a department engine (410). The department engine (410) may store in memory a number of departments for the organization. The rule engine (406) may access the department engine (410) and identify the department given a key field value (408). A key field value (408) may be a unique identifier that identifies an individual such as an employee. As a result, a key field value may be an email address of the employee, an employee number, a social security number or other, key field values that uniquely identifies the individual.

In some examples, the rules include a source field name provided by the registered source fields (424). Further, the rules include a regular expression pattern used to extract the department indicator from the registered source fields (424). The regular expression pattern may include symbol such as ^.*OU={.*}[,$]. The curly brackets delineate the substring of the key field value that indicates the department.

As mentioned above, the rules may include a default value. If the primary or secondary rules fail to determine a department a default value is used. The default value may be none. As a result, no department is assigned.

Further, the rules may specify how to map department indicators to departments. For example, the mapping may be /ie/companyX=Ireland, /bos/us/coX=Boston, /iris/companyX=Boston. The values on the right side of the mapping are from the organization defined departments as defined in the department engine (410).

An overall example of FIG. 4 will now be given. The rule engine (406), using the source field name of the registered source fields (424), determines which user directory (422) to use by looking it up in the registry database of FIG. 2. By determining which of the user directories (422) to use, the rule engine (406) calls the registered API URL sending the key field value (408) associated with the contents for which it needs to determine the department. The user directory (422) returns the meta-data being the named-value pairs with the values for the user requested via the metadata engine (412). The rule matches the regular expression pattern against the value of the meta-data with the source field name. This provides the department indicator. The department indicator is matched to a department map provided by the department engine (410) and the department is established. The user record in the registry database is marked with the department. User administrators are assigned to departments and access to the user records is limited to those user records that match the assigned departments. This provides a departmental segregation in the common directory.

Figure 5:
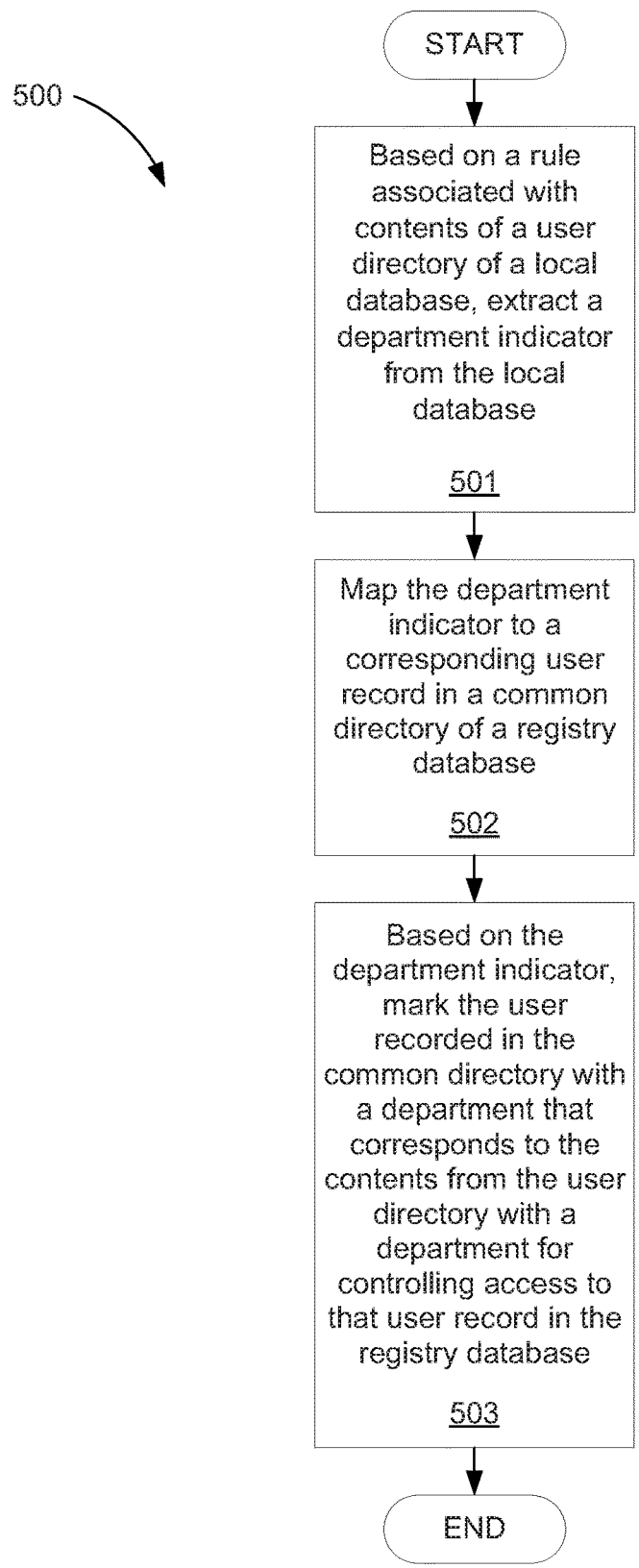
FIG. 5 is a flowchart of an example of a method for merging directory information from a user directory to a common directory, according to one example of principles described herein.

FIG. 5 is a flowchart of an example of a method for merging directory information from a user directory to a common directory, according to one example of principles described herein. The method (500) may be executed by the system (100) of FIG. 1. Further, the method (500) may be executed by other systems such as system 200, system 400, system 700, or system 800. In this example, the method (500) includes based (501) on a rule associated with contents of a user directory of an local database, extracting a department indicator from the user directory, mapping (502) the department indicator to a corresponding user record in a common directory of a registry database, and based (503) on the department indicator, marking the user record in the common directory that corresponds to the contents from the user directory with a department for controlling access to that user record in the registry database.

As mentioned above, the method (500) includes based (501) on a rule associated with contents of a user directory of a local database, a department indicator from the user directory. As mentioned above, a merging system may be used to allow departments, via department indicators, to be determined from contents of a user directory of the local database. In some examples, the method (500) establishes a primary rule, a secondary rule, or a default value and extracts the department indicator from the contents of at least one registered source field of the user directory.

As mentioned above, the method (500) includes mapping (502) the department indicator to a corresponding user record in a common directory of a registry database. The method (500) may map the department indicator to a corresponding user record in a common directory of a registry database as described above.

As mentioned above, the method (500) includes based (503) on the department indicator, marking the user record in the common directory that corresponds to the contents from the user directory with a department for controlling access to that user record in the registry database. Each of the user records are marked with a department. As a result, each of the user records includes a mechanism for maintaining departmental segregation.

Figure 6:
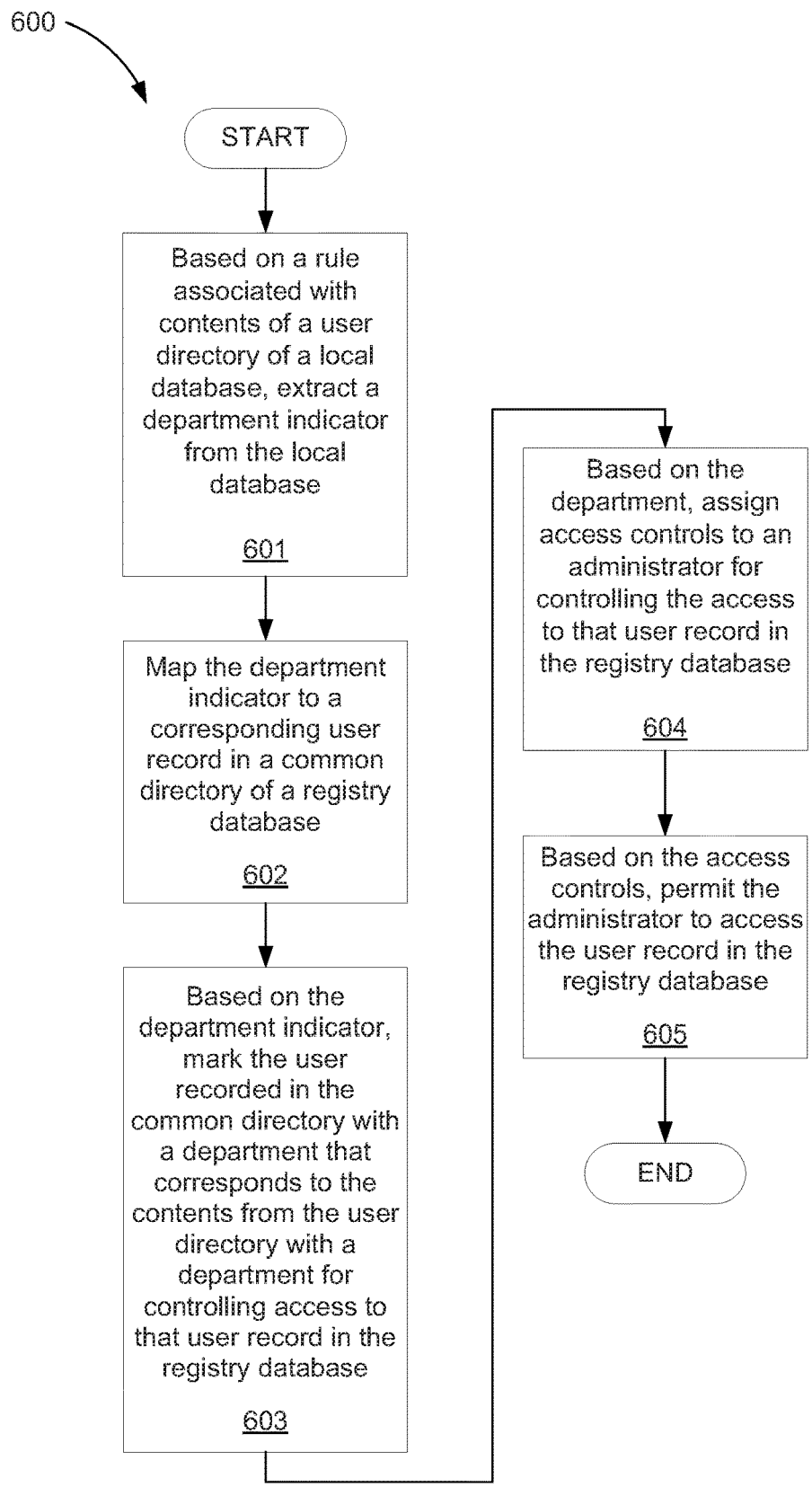
FIG. 6 is a flowchart of an example of a method for merging directory information from a user directory to a common directory, according to one example of principles described herein.

FIG. 6 is a flowchart of an example of a method for merging directory information from a user directory to a common directory, according to one example of principles described herein. The method (600) may be executed by the system (100) of FIG. 1. Further, the method (600) may be executed by other systems such as system 200, system 400, system 700, or system 800. In this example, the method (600) includes based (601) on a rule associated with contents of a user directory of an local database, extracting a department indicator from the user directory, mapping (602) the department indicator to a corresponding user record in a common directory of a registry database, based (603) on the department indicator, marking the user record in the common directory that corresponds to the contents from the user directory with a department for controlling access to that user record in the registry database, based (604) on the department, assigning access controls to an administrator for controlling the access to that user record in the registry database, and based (605) on the access controls, permit the administrator to access the user record in the registry database.

As mentioned above, the method (600) includes based (604) on the department, assigning access controls to an administrator for controlling the access to that user record in the registry database. In some examples, the administrators are assigned access controls to at least one department. For example, administrator A may be assigned access controls to accesses user records in the common directory associated with department A. Administrator B may be assigned access controls to accesses user records in the common directory associated with department A, department B, and department C.

As mentioned above, the method (600) includes based (605) on the access controls, permitting the administrator to access the user record in the registry database. As mentioned above, administrator A may be assigned access controls to accesses user records associated with department A. As a result, administrator A may be permitted access to all user records associated with department A in the registry database. Administrator B may be permitted access to all user records associated with department A, department B, and department C in the registry database.

Figure 7:
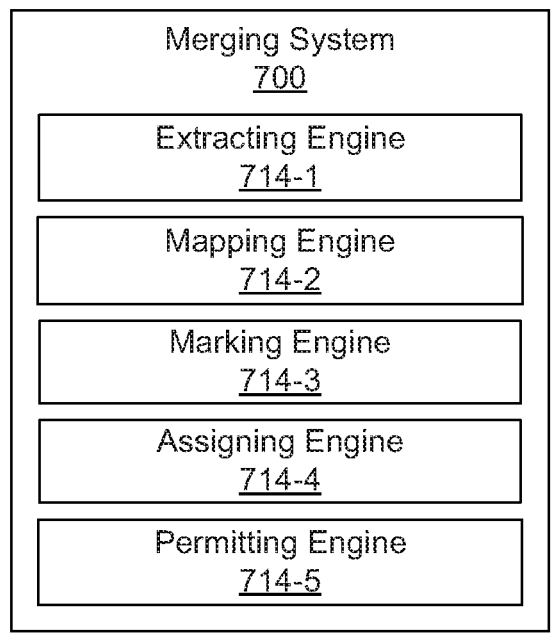
FIG. 7 is a diagram of an example of a merging system, according to the principles described herein.

FIG. 7 is a diagram of an example of a merging system, according to the principles described herein. The merging system (700) includes an extracting engine (714-1), a mapping engine (714-2), a marking engine (714-3), an assigning engine (714-4), and a permitting engine (714-5). The engines (714) refer to a combination of hardware and program instructions to perform a designated function. Alternatively, the engines (714) may be implemented in the form of electronic circuitry (e.g., hardware). Each of the engines (714) may include a processor and memory. Alternatively, one processor may execute the designated function of each of the engines (714). The program instructions are stored in the memory and cause the processor to execute the designated function of the engine.

The extracting engine (714-1) extracts, based on a rule associated with contents of a user directory of a local database, a department indicator from the user directory. The extracting engine (714-1) extracts one department indicator from the user directory. The extracting engine (714-1) extracts several department indicators from the user directory.

The mapping engine (714-2) maps the department indicator to a corresponding user record in a common directory of a registry database. The mapping engine (714-2) maps the department indicator to a corresponding user record in a common directory of one registry database. The mapping engine (714-2) maps the department indicator to several corresponding user records in a common directory of a registry database.

The marking engine (714-3) marks, based on the department indicator, the user record in the common directory that corresponds to the contents from the user directory with a department for controlling access to that user record in the registry database. The marking engine (714-3) marks, based on the department indicator, one user record in the common directory that corresponds to the contents from the user directory with a department for controlling access to that user record in the registry database. The marking engine (714-3) marks, based on the department indicator, several user records in the common directory that corresponds to the contents from the user directory with a department for controlling access to those user records in the registry database.

The assigning engine (714-4) assigns, based on the department, access controls to an administrator for controlling the access to the user record in the registry database. The assigning engine (714-4) assigns, based on the department, access controls to one administrator for controlling the access to the user record in the registry database. The assigning engine (714-4) assigns, based on the department, access controls to several administrators for controlling the access to the user record in the registry database.

The permitting engine (714-5) permits, based on the access controls, the administrator to access the user record in the registry database. The permitting engine (714-5) permits, based on one access control, the administrator to access the user record in the registry database. The permitting engine (714-5) permits, based on several access controls, the administrator to access the user record in the registry database.

Figure 8:
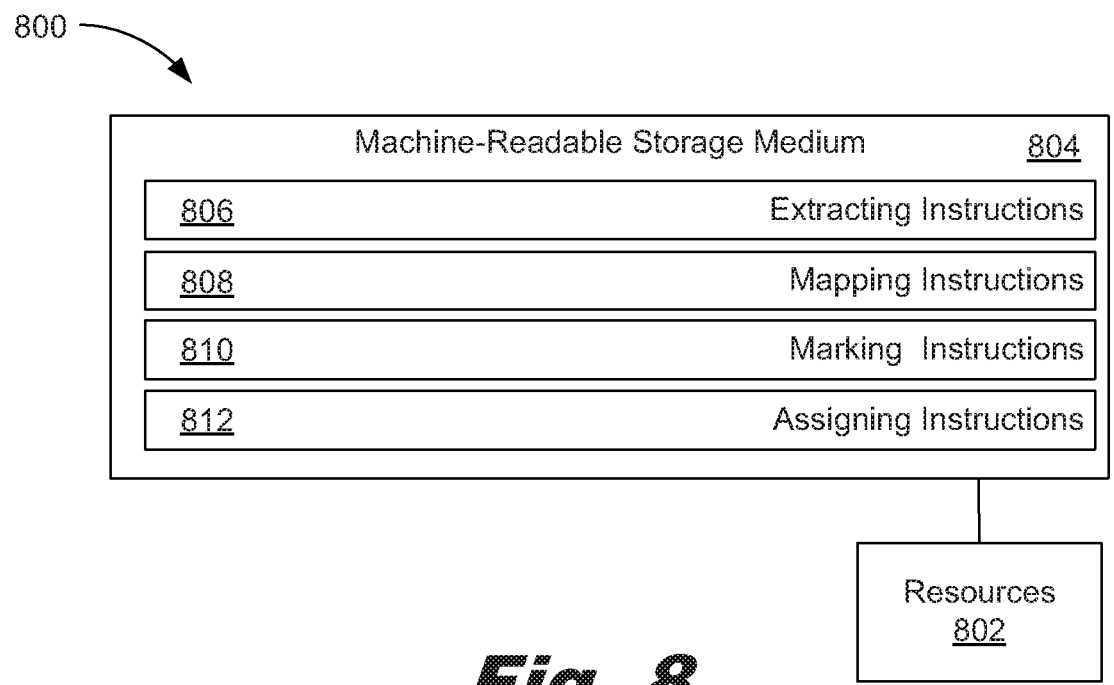
FIG. 8 is a diagram of an example of a merging system, according to the principles described herein.

FIG. 8 is a diagram of an example of a merging system, according to the principles described herein. In this example, the merging system (800) includes resource(s) (802) that are in communication with a machine-readable storage medium (804). Resource(s) (802) may include one processor. In another example, the resource(s) (802) may further include at least one processor and other resources used to process instructions. The machine-readable storage medium (804) represents generally any memory capable of storing data such as instructions or data structures used by the merging system (800). The instructions shown stored in the machine-readable storage medium (804) include extracting instructions (806), mapping instructions (808), marking instructions (810), and assigning instructions (812).

The machine-readable storage medium (804) contains computer readable program code to cause tasks to be executed by the resource(s) (802). The machine-readable storage medium (804) may be tangible and/or physical storage medium. The machine-readable storage medium (804) may be any appropriate storage medium that is not a transmission storage medium. A non-exhaustive list of machine-readable storage medium types includes non-volatile memory, volatile memory, random access memory, write only memory, flash memory, electrically erasable program read only memory, or types of memory, or combinations thereof.

The extracting instructions (806) represents instructions that, when executed, cause the resource(s) (802) to, based on a rule associated with contents of a user directory of a local database, extract a department indicator from the user directory. The mapping instructions (808) represents instructions that, when executed, cause the resource(s) (802) to map the department indicator to a corresponding user record in a common directory of a registry database.

The marking instructions (810) represents instructions that, when executed, cause the resource(s) (802) to, based on the department indicator, mark the user record in the common directory with a department that corresponds to the contents from the user directory with a department for controlling access to that user record in the registry database. The assigning instructions (812) represents instructions that, when executed, cause the resource(s) (802) to, based on the department, assign access controls to an administrator for controlling the access to that user record in the registry database.

Further, the machine-readable storage medium (804) may be part of an installation package. In response to installing the installation package, the instructions of the machine-readable storage medium (804) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the resource(s) (802) and the machine-readable storage medium (804) are located within the same physical component, such as a server, or a network component. The machine-readable storage medium (804) may be part of the physical component's main memory, caches, registers, non-volatile memory, or elsewhere in the physical component's memory hierarchy. Alternatively, the machine-readable storage medium (804) may be in communication with the resource(s) (802) over a network. Further, the data structures, such as the libraries, may be accessed from a remote location over a network connection while the programmed instructions are located locally. Thus, the merging system (800) may be implemented on a user device, on a server, on a collection of servers, or combinations thereof.

The merging system (800) of FIG. 8 may be part of a general purpose computer. However, in alternative examples, the merging system (800) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A system for merging directory information from a user directory to a common directory, the system comprising:
    a processor; and
    computer program code, communicatively coupled to the processor, the computer program code comprising;
    an extracting engine to, based on a rule associated with contents of a user directory of a local database, extract a department indicator from the user directory;
    a mapping engine to map the department indicator to a corresponding user record in a common directory of a registry database;
    a marking engine to, based on the department indicator, mark the user record in the common directory with a department that corresponds to the contents from the user directory with a department for controlling access to that user record in the registry database;
    an assigning engine to, based on the department, assign access controls to an administrator for controlling the access to that user record in the registry database; and
    a permitting engine to, based on the access controls, permit the administrator to access the user record in the registry database.

2. The system of claim 1, wherein the department indicator indicates to which department within a principal organization that a user or a smaller organization belongs; and wherein the rule comprises a regular expression pattern to extract the department indicator from the user directory.

3. The system of claim 1, wherein the mapping engine maps the department indicator to the corresponding user record in the common directory of the registry database by:
    based on a source field name associated with the contents of the user directory of the local database, determining the user directory;
    sending a key field value associated with the contents to a rule engine to determine the department;
    matching, via the rule, a regular expression pattern with a value associated with the source field name to determine the department indicator; and
    based on the department indicator, establishing the department for the marking of the user record in the common directory that corresponds to the contents from the user directory.

4. The system of claim 1, wherein a secondary rule is established when a primary rule fails to determine the department.

5. The system of claim 4, wherein the secondary rule utilizes an alternate user directory to determine the department indicator.

6. The system of claim 4, wherein a default value is used when the primary rule and the secondary rule fails to determine the department.

7. A non-transitory machine-readable storage medium encoded with instructions for merging directory information from a user directory to a common directory, the instructions executable by a processor of a system to cause the system to:
    based on a rule associated with contents of a user directory of a local database, extract a department indicator from the user directory;
    map the department indicator to a corresponding user record in a common directory of a registry database by determining the user directory based on a source field name associated with the contents of the user directory of the local database;

based on the department indicator, mark the user record in the common directory with a department that corresponds to the contents from the user directory with a department for controlling access to that user record in the registry database; and based on the department, assign access controls to an administrator for controlling the access to that user record in the registry database.

8. The machine-readable storage medium of claim 7, further comprising instructions that, when executed, cause the processor to, based on the access controls, permit the administrator to access the user record in the registry database.

9. The machine-readable storage medium of claim 7, wherein the rule comprises a regular expression pattern to extract the department indicator from the user directory; wherein the department indicator indicates to which department within a principal organization that a user or a smaller organization belongs.

10. The machine-readable storage medium of claim 7, further comprising instructions that, when executed, cause the processor to:

send a key field value associated with the contents to a rule engine to determine the department;

match, via the rule, a regular expression pattern with a value associated with the source field name to determine the department indicator; and based on the department indicator, establish the department for the marking of the user record in the common directory that corresponds to the contents from the user directory.

11. The machine-readable storage medium of claim 7, wherein a secondary rule is established when a primary rule fails to determine the department.

12. The machine-readable storage medium of claim 11, wherein the secondary rule utilizes an alternate user directory to determine the department indicator.

13. The machine-readable storage medium of claim 11, wherein a default value is used when the primary rule and the secondary rule fails to determine the department.

14. A system for merging directory information from a user directory to a common directory, the system comprising:

a processor;

a network interface to provide communication for the processor via a computer network; and memory comprising computer program code, communicatively coupled to the processor, the processor executing the computer program code to:

access, via the computer network, a local database and extract a department indicator for a user record in the user directory;

map the department indicator to a corresponding user record in a common directory of a registry database;

mark the user record in the common directory with the department indicator for controlling access to that user record in the common directory of the registry database;

based on the department indicator, assign access controls to an administrator for controlling the access to that user record in the registry database; and control access to that user record in the registry database based on the assigned access controls.

15. The system of claim 14, further comprising a set of rules applied by the processor wherein a primary rule is applied to the user record in the user directory to extract the department indicator for that user record, wherein the set of rules comprises a secondary rule that is applied to the user record in the user directory to extract the department indicator for that user record when the primary rule fails to identify a department indicator for that user record.

16. The system of claim 15, wherein the set of rules comprises a default value that is assigned as the department indicator for a user record when both the primary and secondary rules fail to identify a department indicator for that user record, and wherein the default value is none for the department indicator.

17. The system of claim 14, further comprising an application program interface (API) to accept a call from the local database, the call indicating a list of registered source fields.

18. The system of claim 17, the API further to accept a Uniform Resource Locator (URL) with which the local database can be called back.

19. The system of claim 17, the API further to receive identification of a key field value among the list of registered source fields.

20. The system of claim 17, the processor to use the API to call the local database when extracting a department indicator for a user record.

* * * * *